United States Patent [19]

Miley

[11] 4,310,644

[45] Jan. 12, 1982

[54] VINYL ESTER RESIN COMPOSITIONS

[75] Inventor: John W. Miley, Inman, S.C.

[73] Assignee: Milliken Research Corporation, Spartanburg, S.C.

[21] Appl. No.: 178,149

[22] Filed: Aug. 14, 1980

[51] Int. Cl.³ .................................... C08L 63/10
[52] U.S. Cl. ......................... 525/507; 260/17.4 SG; 260/30.4 EP; 260/30.4 R; 525/1; 525/531; 526/204; 526/320; 528/112; 528/365
[58] Field of Search ............... 260/30.4 EP, 30.4 R, 260/17.4 SG; 525/1, 531, 507; 526/204, 320; 528/112, 365

[56] References Cited

U.S. PATENT DOCUMENTS 3,767,729 10/1973 Murai et al. .................... 525/1
4,151,219 4/1979 Brewbaker et al. ........... 525/531 X Primary Examiner—Earl A. Nielsen
Attorney, Agent, or Firm—H. William Petry; Terry T. Moyer

[57] ABSTRACT

A vinyl ester resin composition having excellent physical, mechanical and handling properties is provided which comprises: a vinyl ester resin made by condensing an epoxy resin and an ethylenically unsaturated monocarboxylic acid; and a thixotropy imparting amount of a thixotropy imparting material selected from at least one condensation product of a sugar alcohol with an aromatic aldehyde.

9 Claims, No Drawings

VINYL ESTER RESIN COMPOSITIONS

The present invention relates to vinyl ester resin compositions, especially shapeable vinyl ester resin compositions containing a thixotropy imparting material.

The so-called "vinyl ester" class of resins have for some years now been recognized as useful for a wide range of resin applications, especially those demanding superior chemical resistance. The resins are chemically the reaction products of epoxy resins and ethylenically unsaturated monocarboxylic acids. Typical vinyl ester resins now commercially available include the EPOCRYL resins, marketed by Shell Chemical Company and others including DERAKANE 411, marketed by Dow Chemical Company, and CO-REZYN VE-8300 marketed by Interplastic Company.

In the use of vinyl ester resins to prepare shaped products, in particular fiberglass reinforced plastic (FRP) structures, the viscosity of the resin composition must be controlled so that the composition is fluid enough for easy application and to permit good wetting of fillers and reinforcements, yet it should not be so fluid as to drain from vertical surfaces thereby resulting in resin-starved areas in the shaped product.

Moreover, in many end use applications, for instance where shaped product such as pipes, tanks, scrubbers, ducts and the like are to be prepared using a vinyl ester resin, excellent body and hold-up characteristics are very important if not critical to the procedure, especially during the shaping and curing steps. In such applications the resin is typically dissolved in a vinyl monomer, e.g., styrene, whereupon it is shaped and cured to produce shaped products. If during the shaping and curing steps the body and hold-up characteristics of the composition are such that outflow or running of the composition occurs when, for instance, the resin composition is applied onto a vertical surface for lining, the resin surface of the shaped product may be of uneven thickness and have a diminished mechanical strength.

It has been heretofore proposed to improve the viscosity characteristics and the body and hold-up characteristics of vinyl ester resins by imparting thixotropy to the vinyl ester resin composition by adding to the composition certain thixotropic agents. Thus, it has been reported that Cab-O-Sil M-5 (a fumed silica product manufactured by Cabot Corporation) and Calidria RG-244 (an asbestos product manufactured by Union Carbide) are "extremely effective" thixotroping additives in certain vinyl ester resin compositions, namely EPOCRYL Resins 21, DRH-321, and DRH-322, all marketed by Shell Chemical Company, (see Unsaturated Polyester Technology edited by Paul F. Bruins; Gordon and Breach Science Publishers). While the known thixotroping additives for vinyl ester resin compositions have provided product compositions which have achieved a fair measure of commercial success, these known additives suffer certain drawbacks in vinyl ester resin compositions and they may fail to effectively prevent outflow or running of the resin. The fumed silica product requires the presence of relatively large amounts of the thixotroping additive in the resin composition to achieve the desired thixotroping effect, and such relatively high concentrations of fumed silica in the cured product may adversely affect the chemical resistance of the product, especially its resistance to basic materials. While the asbestos containing product may provide a relatively high thixotropic index at low concentrations of added thixotrope, its use is being discouraged and may even be prohibited by government regulations due to the recently recognized carcinogenic properties associated with asbestos and asbestos-containing materials. As yet, therefore, apparently no fully effective yet safe thixotroping additive has been proposed for such vinyl ester resins.

Accordingly, the present invention provides vinyl ester resin compositions having excellent thixotropic properties even at relatively low concentrations of added thixotrope. The present invention also provides cured vinyl ester resin compositions having excellent chemical resistance even to basic chemicals. The present invention further provides curable and cured vinyl ester resin which are provided with a non-toxic and safe thixotroping additive that may be handled without special precautions during processing. The present invention further provides a method capable of producing shaped products of vinyl ester resins free from undesired outflow or running of the resins even at relatively low concentrations of added thixotrope.

According to the present invention a vinyl ester resin composition having excellent physical, mechanical, and handling properties is provided which comprises: a vinyl ester resin made by condensing an epoxy resin and an ethylenically unsaturated monocarboxylic acid; and a thixotropy imparting amount of a thixotropy imparting material selected from at least one condensation product of a sugar alcohol with an aromatic aldehyde. Typically such thixotropy imparting amount of the thixotropy imparting material may be from about 0.1 to about 10 percent, preferably about 0.3 to about 5 percent, by weight based on the weight of the resin composition.

As mentioned above, the thixotroping additives of the present invention are selected from at least one condensation product of a sugar alcohol with an aromatic aldehyde. The sugar alcohols may be selected from pentahydric, hexahydric and heptahydric alcohols, such as xylitol, sorbitol, and α-glucoheptitol, and their homologues in various isomeric forms. Examples of aromatic aldehydes which may be condensed with the sugar alcohol include benzaldehyde, ortho-, para-, and meta-tolualdehyde, anisaldehyde and substituted benzaldehydes having 1 to 3 amino groups, nitro groups or halogen atoms in their benzene nucleus.

The thixotroping additives of the present invention may be conveniently prepared by means of a variety of known techniques, such as, for instance, the one disclosed in U.S. Pat. No. 3,767,729 to Murai et al. (assigned to New Japan Chemical Co.). In general the preparation may be accomplished by condensing at least one mole of the sugar alcohol, e.g., sorbitol, with at least one mole of the aromatic aldehyde in the presence of an acidic catalyst. A preferred category of thixotroping additives that may be employed are the benzylidene sorbitols which may be made by condensing sorbitol with benzaldehyde. By adjusting the molar ratio of benzaldehyde to sorbitol, monobenzylidene sorbitol, dibenzylidene sorbitol and tribenzylidene sorbitol can be produced selectively. According to the invention all of these benzylidene sorbitols can be used alone or in admixture with one another. Therefore, even when a mixture of benzylidene sorbitols is produced, there is no need to isolate them. Most preferred in the invention are dibenzylidene sorbitol, mixtures of monobenzylidene sorbitol and dibenzylidene sorbitol or mixtures of dibenzylidene sorbitol and tribenzylidene sorbitol. The amount of thixotroping additive to be added to the vinyl ester resin composition is usually in the range of about 0.1 to about 10 percent, preferably about 0.3 to 5 percent, by weight based on the weight of the resin composition. The addition of the thixotroping additive generally results in little or no adverse effect on the shaping properties of the resin composition, nor does it affect adversely the mechanical strength or chemical resistance of the shaped product.

Typically, the vinyl ester resin composition may be prepared by dissolving the vinyl ester in a suitable compatible diluent to facilitate handling, cure and to provide excellent mechanical properties. Such compatible diluents may include, for instance, styrene, chlorostyrene, vinyl toluene, α-methyl styrene, diallyl phthalate, triallyl cyanurate, acrylate and methacrylate esters, and divinyl benzene. Styrene is the preferred compatible diluent. The resin, however, may also be dissolved in a non-reactive diluent, such as, for instance, acetone where low application viscosity is required but where properties obtainable only with the neat resin are desired.

The vinyl ester resins of the present invention are well known in the art and may be prepared by an addition reaction between various epoxy resins and ethylenically unsaturated monocarboxylic acids. Patents which have issued within the last several years disclosing processes for preparing vinyl ester resins within the scope of the present invention include U.S. Pat. No. 3,256,226 to Fekete et al., and No. 3,317,465 to Doyle et al., both assigned to H. H. Robertson Co.; No. 3,345,401 to May; No. 3,373,221 to May; No. 3,377,406 to Newey; and No. 3,432,478 to May, all assigned to Shell Oil Co.; No. 3,548,030 to Jernigan; and No. 3,564,074 to Swisher et al., both assigned to Dow Chemical Co.; No. 3,634,542 to Dowd et al.; and No. 3,637,618 to May, both assigned to Shell Oil Co. The disclosures of those patents are all incorporated herein by reference.

In general the reaction by means of which the vinyl ester resins of the present invention are prepared is straightforward and may be catalyzed by suitable catalysts, such as for instance, tertiary amines, phosphines, alkalis or -onium salts. The general equation for the reaction is set forth below:

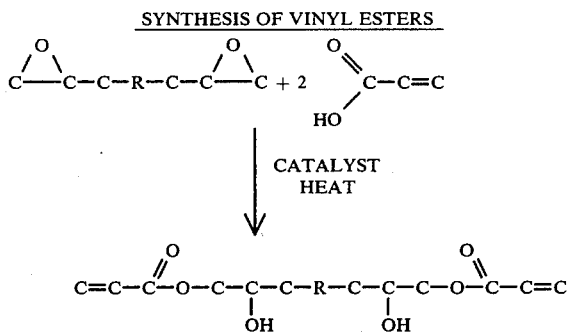

wherein R is selected from, for instance, alkylene, cycloalkylene, arylene, arylalkylene, oxyarylene, oxyarylalkylene and cycloalkylene ester.

The basic components of several vinyl ester resins are set forth below:

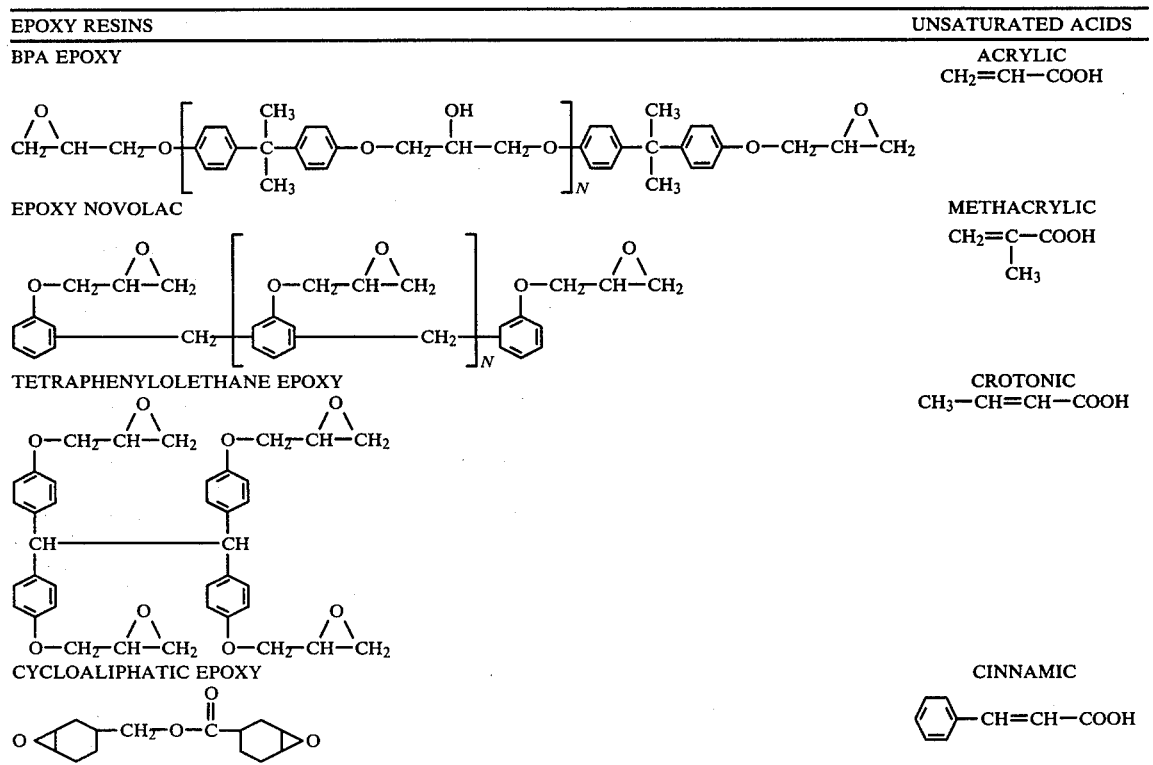

A substantial number of different vinyl ester resins having distinct characteristics may be prepared by combining different epoxy resins with various unsaturated acids. The variety of products may of course be even further extended depending upon the selection of the unsaturated monomer diluents which can be combined with and copolymerized with the vinyl ester resin. The vinyl ester resins which have so far achieved the greatest utility and which are therefore preferred according to the present invention are the bisphenol-A (BPA)-epoxy based vinyl ester resins. These resins may be employed in the resin compositions of the present invention either with or without a diluent coreactive monomer such as styrene.

The BPA-epoxy based vinyl ester resins provide the convenience and practical handling properties of ambient temperature cure polyester systems and yet they exhibit the excellent physical/mechanical properties associated with well-cured epoxy resin systems, thus combining the desired properties of these two different thermosetting resins into a single resin system.

The vinyl ester resin systems of the present invention possess excellent physical, mechanical and handling properties, and these properties may be attributed to their molecular structure shown in simplified form below:

chemical attack. The vinyl esters, on the other hand, contain only terminal ester groups which are also fewer in number as compared with the BPA-fumarate polyester. Thus there are fewer vulnerable sites in the vinyl ester resin. Further, attack can occur only at these terminal sites leaving the backbone of the molecule unaffected. As mentioned previously, substituents on the acid moiety, such as the methyl group of methacrylic acid, may also protect the ester group against hydrolysis.

The thixotropy imparting material may be added to the vinyl ester resin composition by means of a wide range of addition techniques. One convenient means of addition, however, is to first dissolve the thixotropy imparting material in a suitable solvent which is compatible with the vinyl ester resin. Such solvents may include for instance, dimethylformamide, dimethylsulfoxide, and other compatible solvents. In addition to the vinyl ester resin, thixotroping additive and optionally a

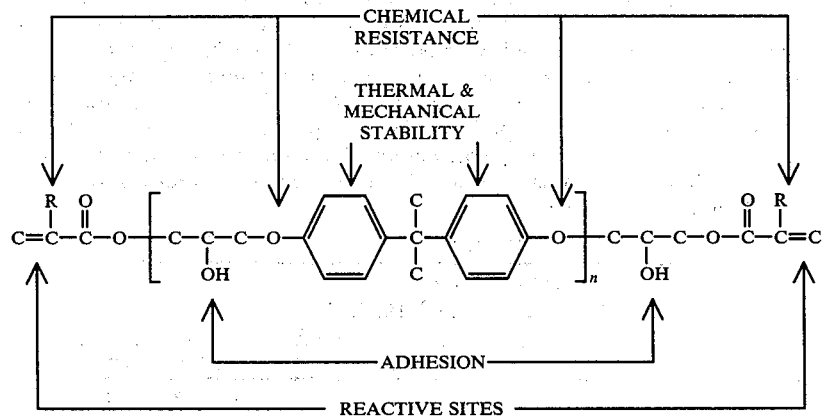

In the above simplified formula R may be, for instance, hydrogen, lower alkyl, e.g., methyl ethyl, propyl, etc. and n is from about one to about five. These products, representing a successful marriage of epoxies and polyesters, may exhibit characteristics of each. Within the epoxy resin moiety, the aromatic rings may provide good mechanical properties and heat resistance. The ether linkages may contribute to good chemical resistance. The pendant hydroxyl groups may provide adhesion and a reactive site for further modification, as for example by reaction with anhydrides or isocyanates. Substituents may be provided at the hydroxyl site and may alter properties to suit specific end use application requirements. The pendant hydroxyls probably also enhance the reactivity of the double bond. The unsaturated acid moiety may provide the reactive site for cross-linking and may provide the products with some or all of the cure characteristics of polyester resins. Substituents within the acid moiety may also affect the chemical resistance. For instance, the methyl group of methacrylic acid stabilizes the ester group toward hydrolysis, and for this reason the methacrylate vinyl esters may be more resistant to chemical attack than are the acrylate vinyl ester resins.

The terminal location of the ester groups also may contribute to the superior chemical resistance of these products. The recurring ester groups along the backbone of the typical bisphenol-A-furmarate polyester, for instance, are the most vulnerable part of the resin since they are subject to hydrolysis. Once hydrolyzed the polymer chain is broken leaving it susceptible to further reactive or non-reactive diluent, the resin compositions of the present invention may further be provided with catalysts, inhibitors, fillers, pigments and other known conventional additives.

The vinyl ester resin composition of the invention may be polymerized and cross-linked by means of free radical generating initiators which are well-known in the art. Polymerization of the resins is by means of a true addition reaction and typically no by-products may be formed. Typical initiators include peroxides such as benzoyl peroxide, methyl ethyl ketone peroxide, other organic peroxides as well as other sources of free radicals. For example, photoinitiators which generate free radicals may also be used to initiate polymerization of the resins of the present invention. The initiator may be used with certain accelerators or promoters which include, for instance, tertiary amines, like dimethyl or diethyl aniline, and the metallic soaps, such as cobalt or manganese octoate or naphthenate, etc. Other accelerators or promoters well-known in the art may also be employed.

Various shaping methods may be employed to shape the resin composition. Examples include hand layup method, sprayup method, cold press method, bag method, matched die method, filament winding method, continuous molding method and the like.

For a better understanding of the present invention, the following non-limiting examples are provided. Unless otherwise indicated all parts and percentages are by weight.

EXAMPLES 1-5

In Examples 1-4 a thixotropy imparting material within the scope of the present invention, namely essentially pure dibenzylidene sorbitol (DBS), was added in varying amounts based on the weight of the resin composition to Shell's EPOCRYL Resin 322-45 which is a bisphenol-A epoxy-based vinyl ester resin terminated with methacrylate ester functionality. The resin is supplied in a 45% styrene solution and has a viscosity of about 700 cps at 25° C.

The DBS (which was prepared as described in U.S. Pat. No. 3,767,729 to Murai) was incorporated in the resin by first preparing a 15 percent solution of the DBS in dimethylformamide and then the DBS solution was incorporated into the resin solution using a Fisher Dynamix electric stirrer at a setting of 10 which provided a speed of about 300 rpms. After addition to the resin solution the viscosity of the solution was measured at 25° C. using a Brookfield Model RVF Viscometer at 2 rpms and at 20 rpms and the visocity index (VI) was determined as the ratio of the viscosity of the solution at two rpms to the viscosity at 20 rpms. Viscosity data was collected at intervals of one hour, sixteen hours and 19 days after the preparation of the solution. In Example 5 viscosity information was determined for a control sample of the resin containing no added thixotropy imparting material.

TABLE 1

SHELL EPOCRYL RESIN 322-45
Brookfield Viscosity (Centipoises at 25° C.)

| Example # | % Dibenzylidene Sorbitol | 1 HOUR 2 RPM | 20 RPM | VI* | 16 HOURS 2 RPM | 20 RPM | VI* | 19 DAYS 2 RPM | 20 RPM | VI* |
|---|---|---|---|---|---|---|---|---|---|---|
| 1 | 0.15 | 650 | 590 | 1.1 | 700 | 625 | 1.1 | 700 | 655 | 1.1 |
| 2 | 0.25 | 800 | 670 | 1.2 | 1550 | 1270 | 1.2 | 2350 | 1460 | 1.6 |
| 3 | 0.35 | 4600 | 2185 | 2.1 | 7200 | 3110 | 2.3 | 9900 | 3780 | 2.6 |
| 4 | 0.50 | 18000 | 6020 | 3.0 | 22600 | 7420 | 3.0 | 31800 | 11180 | 2.8 |
| 5 | Control | 750 | 665 | 1.1 | | | | | | |

*VI = THE VISCOSITY INDEX RATIO OF THE VISCOSITY AT 2 RPM OVER THE VISCOSITY AT 20 RPM.

Examples 6-8

In Examples 6-8 the vinyl ester resin employed was Dow's Derakane Resin 411-45 which is a bisphenol-A based vinyl ester resin having methacrylate functionality. It is sold as a 55% solution in styrene with a typical viscosity of 400-700 cps. The same method was employed for incorporation of the DBS into the resin as was employed in Examples 1-4. Viscosity data was collected after one hour, seventeen hours and eleven days.

TABLE 2

DOW DERAKANE RESIN 411-45
Brookfield Viscosity (CPS at 25° C.)

| Example # | % Dibenzylidene Sorbitol | 1 HOUR 2 RPM | 20 RPM | VI | 17 HOURS 2 RPM | 20 RPM | VI | 11 DAYS 2 RPM | 20 RPM | VI |
|---|---|---|---|---|---|---|---|---|---|---|
| 6 | 0.15 | 700 | 670 | 1.0 | 1400 | 920 | 1.5 | 6600 | 860 | 2.3 |
| 7 | 0.25 | 17600 | 3820 | 4.6 | 23800 | 6720 | 3.5 | 33200 | 10800 | 3.1 |
| 8 | 0.35 | 16000 | 5320 | 3.0 | 28000 | 9360 | 3.0 | 44800 | 15600 | 2.9 |

Examples 9-13

In examples 9-13 the vinyl ester resin employed was Interplastics CO-REZYN VE-8300 which is a bisphenol-A based vinyl ester resin having methacrylate functionality. It is sold as a 55% solution in styrene with a typical viscosity of 400-600 cps. The same method was employed for incorporation of the DBS into the resin as was employed in Examples 1-4. Viscosity data was collected after one hour, twenty hours and twenty days.

TABLE 3

INTERPLASTIC CO-REZYN VE-8300
Brookfield Viscosity (CPS at 25° C.)

| Example # | % Dibenzylidene Sorbitol | 1 HOUR 2 RPM | 20 RPM | VI | 20 HOURS 2 RPM | 20 RPM | VI | 20 DAYS 2 RPM | 20 RPM | VI |
|---|---|---|---|---|---|---|---|---|---|---|
| 9 | 0.15 | 530 | 550 | 1.0 | 800 | 710 | 1.1 | 1800 | 1340 | 1.3 |
| 10 | 0.25 | 700 | 585 | 1.2 | 2800 | 1720 | 1.6 | 18000 | 7450 | 2.4 |
| 11 | 0.35 | 8300 | 2625 | 3.2 | 32200 | 9100 | 3.5 | 33500 | 12500 | 2.7 |
| 12 | 0.50 | 24200 | 5560 | 4.4 | 41400 | 13600 | 3.0 | 47000 | 14100 | 3.3 |
| 13 | 1.00 | 22400 | 8280 | 2.7 | 34200 | 12300 | 2.8 | 77500 | 19950 | 3.9 |

Examples 14-16

In examples 14-16 the vinyl ester resin employed was Dow's DERAKANE RESIN 411-45. The DBS was incorporated using the same procedure set forth in Example 1 except that the DBS was dissolved in dimethylsulfoxide rather than dimethyl formamide to form a 25 percent by weight solution of the thixotropy imparting material in the resin. Viscosity information was collected after one hour, seventeen hours, and twenty days. The results are summarized in Table 4.

TABLE 4

| | | DOW DERAKANE RESIN 411-45 | | | | | | | | |
|---|---|---|---|---|---|---|---|---|---|---|
| | % Dibenzylidene | 1 HOUR | | | 17 HOURS | | | 20 DAYS | | |
| Example | Sorbitol | 2 RPM | 20 RPM | VI | 2 RPM | 20 RPM | VI | 2 RPM | 20 RPM | VI |
| 14 | 0.15 | 670 | 700 | 1.0 | 1400 | 920 | 1.5 | 8400 | 2930 | 2.9 |
| 15 | 0.25 | 17600 | 3820 | 4.6 | 23800 | 6720 | 3.5 | 25900 | 7970 | 3.2 |
| 16 | 0.35 | 16000 | 5320 | 3.0 | 28000 | 9360 | 3.0 | 48600 | 12500 | 3.9 |

Examples 17-21

In these examples the improved resistance to solvents of a variety of cured vinyl ester resin samples containing DBS as a thixotropy imparting material in varying concentrations is illustrated.

Samples were prepared by making a master batch of Epocryl 322 which contained 0.25% cobalt naphthenate (8% Co) and 0.25% N,N-dimethylaniline. Example 17 was a control sample containing no thixotropy imparting material. In Examples 18 and 19 a 25 percent solution of DBS in dimethylsulfoxide was prepared. In Examples 20 and 21 a 15 percent solution of DBS in dimethylformamide was prepared. The solution was added to the resin sample in each instance in an amount sufficient to provide the indicated amount of DBS in the product resin set forth in Table 5.

TABLE 5

| PERCENT WEIGHT INCREASE OF CURED VINYL ESTER RESIN IMMERSED IN SOLVENT | | | | | | | | | | |
|---|---|---|---|---|---|---|---|---|---|---|
| | 17 Control | | 18 0.07% DBS | | 19 0.2% DBS/DMSO | | 20 0.07% DBS/DMF | | 21 0.20% DBS/DMF | |
| Example | 4 Days | 14 Days | 4 Days | 14 Days | 4 Days | 14 Days | 4 Days | 14 Days | 4 Days | 14 Days |
| Water | 0.40 | 0.54 | 0.44 | 0.53 | 0.41 | 0.57 | 0.43 | 0.54 | 0.33 | 0.53 |
| HOAc | 2.08 | 4.25 | 1.69 | 3.40 | 1.65 | 3.43 | 1.63 | 3.57 | 1.38 | 2.08 |
| Acetone | 1.27 | 2.12 | 1.05 | 2.00 | 1.21 | 1.77 | 1.05 | 1.57 | 0.84 | 1.40 |

The mixtures were then stirred and then LUBERSOL DDM-9, a 9% solution of methyl ethyl ketone peroxide in plasticizer sold by the Lucidol Division of Pennwalt Corporation was added in the amount of 2.1% based on the total weight of the mixture. After further stirring the formulations were cast in a rod-shaped mold. After curing at room temperature for several hours, the bars were removed from the molds and were post-cured in an oven at 50° C. for twelve hours. After post curing disks were cut from the bars, polished slightly to remove rough edges and loose particles, and weighed prior to exposure to solvent. After immersion in the solvent identified in Table 5 column 1 for the period of time indicated in the table, the samples were removed, dried to remove excess fluid and reweighed to determine weight gain. The percent weight gain shown in Table 5 was calculated by dividing the difference in weight before and after solvent exposure by the initial weight and multiplying by one hundred.

What is claimed is:

1. A vinyl ester resin composition having excellent physical, mechanical and handling properties which comprises: a vinyl ester resin made by condensing an epoxy resin and an ethylenically unsaturated monocarboxylic acid; and a thixotropy imparting amount of a thixotropy imparting material selected from at least one condensation product of a sugar alcohol and an aromatic aldehyde.

2. The vinyl ester resin composition of claim 1, wherein said vinyl ester resin is dissolved in a suitable compatible diluent to facilitate handling, cure and to provide excellent mechanical properties.

3. The vinyl ester resin composition of claim 2, wherein said diluent is a reactive, ethylenically unsaturated comonomer.

4. The vinyl ester resin composition of claim 3, wherein said reactive comonomer is selected from styrene, chlorostyrene, vinyl toluene, alpha-methyl styrene, diallyl phthalate, trialyl cyanurate, acrylate and methacrylate esters, and divinyl benzene.

5. The vinyl ester resin composition of claim 2, wherein said diluent is a non-reactive diluent.

6. The vinyl ester resin composition of claim 1, wherein said sugar alcohol is selected from pentahydric, hexahydric and heptahydric alcohols and said aromatic aldehyde is selected from benzaldehyde, ortho-, para-, and meta-tolualdehyde, anisaldehyde, and substituted benzaldehydes having 1 to 3 amino groups, nitro groups and halogen atoms in their benzene nucleus.

7. The vinyl ester resin composition of claim 1, wherein said condensation product of a sugar alcohol and an aromatic aldehyde is selected from monobenzylidene sorbitol, dibenzylidene sorbitol, tribenzylidene sorbitol and mixtures thereof.

8. The vinyl ester resin composition of claim 1, wherein said thixotroping additive is added to the vinyl ester resin composition in an amount of from about 0.1 to about 10 percent by weight.

9. The vinyl ester resin composition of claim 1, wherein said vinyl ester resin is made by condensing an epoxy resin selected from BPA epoxy, epoxy novalac, tetraphenylolethane epoxy, and cycloaliphatic epoxy with an ethylenically unsaturated monocarboxylic acid selected from acrylic acid, methacrylic acid, crotonic acid, and cinnamic acid.

* * * * *